(12) United States Patent
Cheung et al.

(10) Patent No.: US 7,492,711 B1
(45) Date of Patent: Feb. 17, 2009

(54) LINK SIZING BASED ON BOTH USER BEHAVIOR AND TRAFFIC CHARACTERISTICS

(75) Inventors: Michael Cheung, San Jose, CA (US); Mark Ammar Rayes, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 908 days.

(21) Appl. No.: 10/646,661

(22) Filed: Aug. 21, 2003

(51) Int. Cl.
*G01R 31/08* (2006.01)

(52) U.S. Cl. .............. 370/230.1; 370/235; 370/395.21

(58) Field of Classification Search ............... 370/229, 370/230, 230.1, 231–235, 236, 395.2, 395.21, 370/351, 352, 254; 709/223–229, 232; 379/8, 379/381, 112.03, 142.01, 142.02, 168, 184, 379/201.01, 210.02, 210.03, 241, 273, 390.02
See application file for complete search history.

(56) References Cited

U.S. PATENT DOCUMENTS

| | | | | |
|---|---|---|---|---|
| 4,200,771 A | * | 4/1980 | Kraushaar et al. ........... 379/138 |
| 5,359,593 A | * | 10/1994 | Derby et al. ................ 370/234 |
| 5,583,857 A | * | 12/1996 | Soumiya et al. ............ 370/233 |
| 5,699,346 A | * | 12/1997 | VanDervort ................. 370/233 |
| 5,838,671 A | * | 11/1998 | Ishikawa et al. ............ 370/335 |
| 5,854,903 A | * | 12/1998 | Morrison et al. ............ 709/249 |
| 6,118,764 A | * | 9/2000 | Depelteau et al. ........... 370/235 |
| 6,788,646 B1 | * | 9/2004 | Fodor et al. ................. 370/230 |
| 2004/0062256 A1 | * | 4/2004 | Takeuchi et al. ............ 370/401 |
| 2005/0111647 A1 | * | 5/2005 | Mashinsky ............. 379/210.01 |

OTHER PUBLICATIONS

M. Schwartz, "Broadband Integrated Networks," Section 3.3, Prentice Hall PTR,. 1996, pp. 32-45.
D. Anick, et al., "Stochastic Theory of a Data-Handling System with Multiple Sources," vol. 61, No. 8, Oct. 1982, 13 pages.
Maged Beshai, et al., "Interaction of Call Blocking and Cell Loss in an ATM Network," IEEE Journal on Selected Areas in Communications, vol. 12, No. 6, Aug. 1994, pp. 1051-1058.
Anwar I. Elwalid, et al., "Effective Bandwidth of General Markovian Traffic Sources and Admission Control of High Speed Networks," IEEE/ACM Transactions on Networking, vol. 1, No. 3, Jun. 1993, pp. 329-343.

* cited by examiner

*Primary Examiner*—Ian N Moore
(74) *Attorney, Agent, or Firm*—Hickman Palermo Truong & Becker LLP

(57) ABSTRACT

A method of determining an amount of bandwidth needed on a communication link is disclosed. According to one aspect of the method, instead of considering only user behavior or only traffic characteristics, the amount of bandwidth needed on the link is determined based on both user behavior and traffic characteristics. The determined amount is stored in memory. By accounting for both user behavior and traffic characteristics, the method determines the amount of bandwidth needed on a communication link more accurately.

29 Claims, 4 Drawing Sheets

LINK SIZING BASED ON BOTH USER BEHAVIOR AND TRAFFIC CHARACTERISTICS

FIELD OF THE INVENTION

The present invention generally relates to computer network analysis. The invention relates more specifically to a method and apparatus for link sizing based on both user behavior and traffic characteristics.

BACKGROUND OF THE INVENTION

The approaches described in this section could be pursued, but are not necessarily approaches that previously have been conceived or pursued. Therefore, unless otherwise indicated herein, the approaches described in this section are not prior art to the claims in this application and are not admitted to be prior art by inclusion in this section.

Computers and other devices can be enabled to communicate with each other through a computer network, such as a local area network (LAN), wide area network (WAN), or inter-network. In some networks, end stations, such as computers, are connected to intermediate network elements, such as routers, through communication links. The intermediate network elements also are connected to each other through communication links. Thus, one or more paths of communication links are established between end stations in a network.

A communication link, such as a cable, has a capacity. The capacity of a communication link describes the rate at which the communication link can transmit data. The rate at which data can be transmitted is often called "bandwidth." For example, a communication link's bandwidth may be expressed as a number of bits per second. Some kinds of communication links have greater capacities than other kinds of communication links. The capacity of a communication link may be called the "size" of the communication link.

A single communication link may carry data transmitted to and from multiple end stations. For example, multiple end stations may be connected to single intermediate network element, which may be connected to a network through a single communication link. In such a configuration, all communication between any of the end stations and the network passes through the single communication link. Consequently, all of the end stations share the bandwidth of the single communication link. While a user of one end station is using a portion of the bandwidth, that portion is unavailable to users of the other end stations.

Users may enter into agreements with network service providers in order to obtain network connectivity. Such agreements are often called "service level agreements," or "SLAs." For example, a user may agree to pay a network service provider a specified amount of money per month in exchange for network access. Often, an agreement guarantees a minimum quality of service (QoS) and/or grade of service (GoS) to a user.

A QoS may specify several factors, such as the maximum probability that a data packet will be lost, and/or the maximum delay that a data packet will experience in transit. Generally, QoS factors relate to characteristics of data packets. In other words, QoS factors generally relate to traffic characteristics.

A GoS also may specify several factors, such as the maximum probability that a user's attempt to establish a communication session with the network will fail. A user's attempt to establish a communication session with the network may fail if a communication link's available bandwidth is less than the bandwidth that the communication session requires. In a converged network that provides packet voice service, a communication session is referred to as a "call."

For example, when a user dials a telephone number on a telephone, the user initiates a call. When the user hangs up the telephone, the user terminates the call. For another example, when a user logs on to a network, the user initiates a call. When the user logs off of the network, the user terminates the call. The probability that an attempt to establish a communication session will fail is referred to as the "call blocking probability." Thus, a GoS may specify a maximum call blocking probability. Generally, GoS factors relate to characteristics of calls.

As mentioned above, multiple end stations may share the bandwidth of a single communication link. Each such end station may be associated with a user who has been guaranteed a minimum QoS and a minimum GoS. The number of users that share a single communication link may fluctuate. For example, additional users may subscribe to the services of a network server provider that provides network access through the single communication link. Furthermore, the amount of bandwidth used by each user may fluctuate. When the number of users that share a current communication link increases, or when the combined amount of bandwidth used by the users increases, the bandwidth of the current communication link might become less than that necessary to guarantee the users the minimum QoS and the minimum GoS. In order to maintain this guarantee, the current communication link might need to be replaced with a communication link that has greater bandwidth.

Typically, bandwidth comes at a price. Communication links that provide greater bandwidth also cost more. For example, a T3 link provides greater bandwidth than a T1 link, but also costs more than the T1 link. To reduce costs, it is desirable to determine the minimum increase in bandwidth that is needed to support a specified increase in the number of users that share a communication link. The process of making this determination may be referred to as "link sizing." Some previous approaches to making this determination exist.

Some approaches make the determination based solely on call characteristics. Call characteristics are a product of user behavior. For example, some approaches make the determination based solely on the average time between the arrivals of new calls on a communication link (the "inter-call arrival time") and the average duration of calls on a communication link. Such approaches typically are used to determine the capacities of links in telephone networks. For each call currently on a communication link in a telephone network, a separate portion of the capacity of the communication link is dedicated exclusively to that call. Regardless of whether participants in a particular call are actively using the portion dedicated to the call, for example, by speaking, the portion is not made available to other calls during the particular call.

These call-characteristic-only-based approaches typically overestimate needed bandwidth when applied to networks in which a portion of overall bandwidth is not dedicated exclusively to a call. In Internet Protocol (IP) networks, the overall bandwidth of a communication link may be allocated among calls based on the calls' usage of the bandwidth at a given moment. For example, if a first call does not actively transmit data packets during a period of time, then, during that period of time, a second call may transmit data packets using the bandwidth formerly used by the first call. When the first call again actively transmits data packets, the second call may cease using the bandwidth being used by the first call. In this manner, less available bandwidth is wasted, and a greater number of calls may be supported. However, because callcharacteristic-only-based approaches do not account for the sharing of bandwidth in this manner, call-characteristic-only-based approaches may determine an amount greater than the minimum amount of bandwidth that actually is needed to sustain a specified number of users.

Other approaches determine the needed increase in bandwidth based solely on traffic characteristics. For example, some approaches make the determination based solely on data burst characteristics during calls and how frequently data packets arrive during a burst on a communication link. A burst period is a period of time during which data packets arrive on a communication link relatively continuously. Such approaches typically are used to determine the capacities of links in IP networks. Examples of approaches that are based solely on traffic characteristics are discussed in A. I. Elwalid and D. Mitra, "Effective Bandwidth of General Markovian Traffic Sources and Admission Control of High Speed Networks," *IEEE/ACM Transactions on Networking*, vol. 1, pp. 329-343, June 1993; D. Anick, D. Mitra, and M. M. Sondhi, "Stochastic Theory of a Data-Handling System with Multiple Sources," *The Bell System Technical Journal*, vol. 51, pp. 1871-1894, October 1982; and M. Schwartz, *Broadband Integrated Networks*, Prentice Hall PTR, 1996.

These traffic-characteristic-only-based approaches typically overestimate needed bandwidth when applied to networks in which calls are discrete and of limited duration. In a telephone network, a particular user might establish a call that lasts for a limited duration, and then terminate the call. A substantial amount of time might pass before the particular user establishes another call. Because traffic-characteristic-only-based approaches do not account for the limited duration of calls in some networks, traffic-characteristic-only-based approaches may determine an amount greater than the minimum amount of bandwidth that actually is needed to sustain a specified number of users. Some of the shortcomings of traffic-characteristic-only-based approaches are discussed in M. Beshai, R. Kositpaiboon, and J. Yan, "Interaction of Call Blocking and Cell Loss in an ATM Network," *IEEE Journal on Selected Areas of Communications*, vol. 12, pp. 1051-1058, August 1994.

The shortcomings of the approaches described above are at least partially a consequence of the limited scope of information that each such approach considers in making a determination of needed bandwidth. Based on the foregoing, there is a clear need for a method that considers a broader scope of information in determining the minimum amount of bandwidth needed on a communication link.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for link sizing based on both user behavior and traffic characteristics is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Functional Overview
   3.0 Method of Link Sizing Based on Both User Behavior and Traffic Characteristics
      3.1 Formulating and Solving the Constraint Optimization Problem
      3.2 Modeling User Calling Behavior and Traffic Sources Using a Poisson Process and a Two State On/Off Process
   4.0 Implementation Mechanisms-Hardware Overview
   5.0 Extensions and Alternatives 1.0 General Overview The needs identified in the foregoing Background, and other needs and objects that will become apparent from the following description, are achieved in the present invention, which comprises, in one aspect, a method for link sizing based on both user behavior and traffic characteristics. According to one aspect of the method, an amount of bandwidth needed on a link (i.e., a link size) is determined based on both user behavior and traffic characteristics. The determined amount is stored in memory.

Unlike other approaches to link sizing, techniques disclosed herein do not restrict the information considered in determining the link size to user behavior alone or traffic behavior alone. As a result, techniques disclosed herein determine a minimum required link size with greater accuracy than other approaches.

In other aspects, the invention encompasses a computer apparatus and a computer-readable medium configured to carry out the foregoing steps.

2.0 Functional Overview

Figure 1:
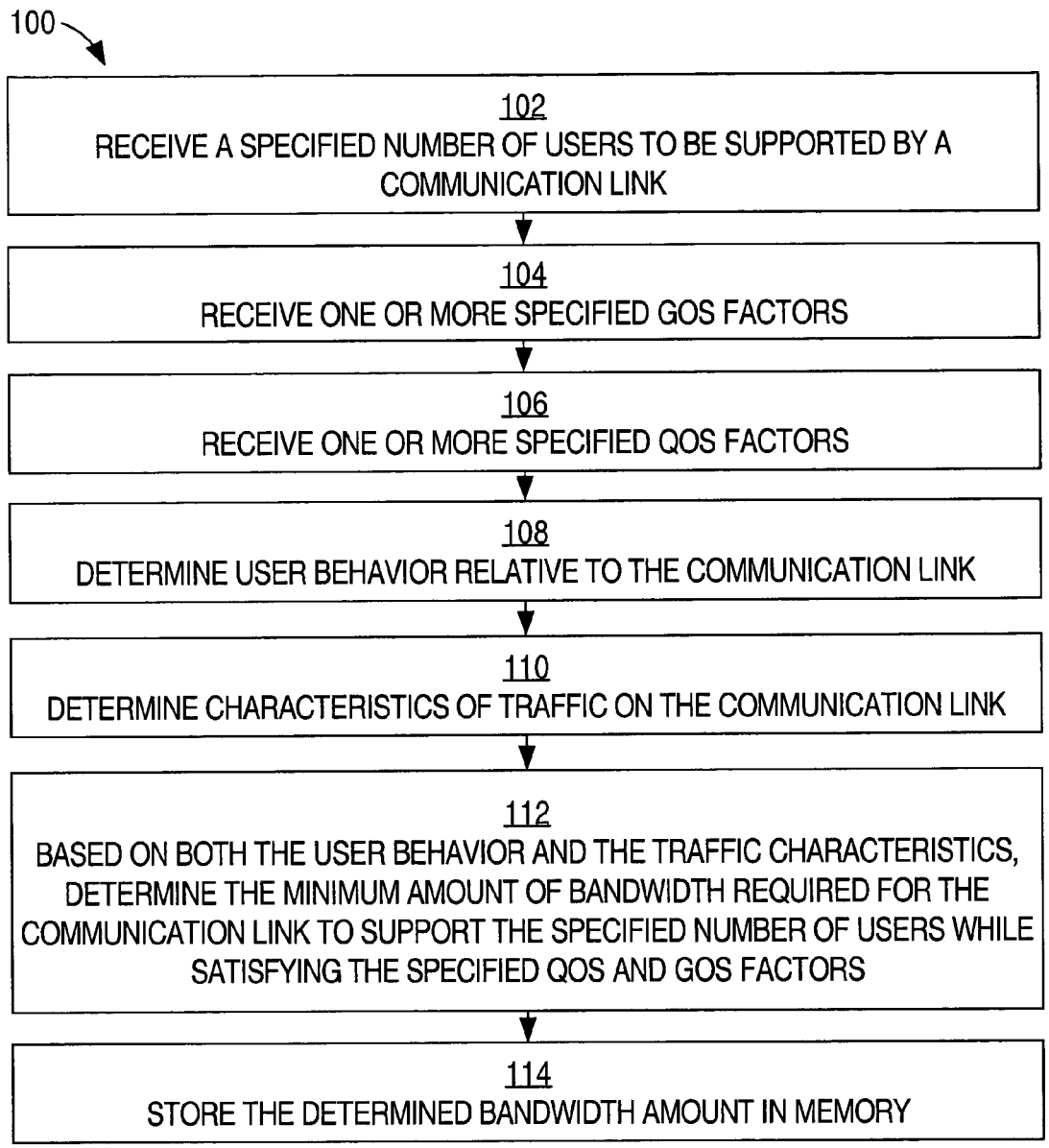
FIG. 1 is a flow diagram that illustrates a high level overview of one embodiment of a method for link sizing based on both user behavior and traffic characteristics.

FIG. 1 is a flow diagram that illustrates a high level overview of one embodiment of a method 100 for link sizing based on both user behavior and traffic characteristics. Such a method may be performed by any of many different mechanisms, such as, for example, computer system 400 described below with reference to FIG. 4, or a network management software application that is hosted by system 400.

In block 102, a specified number of users to be supported by a communication link is received. For example, the specified number of users may be the maximum number of users that might simultaneously attempt to participate in calls over the communication link.

In block 104, one or more specified GoS factors are received. For example, the one or more GoS factors may comprise a maximum call blocking probability requirement that is specified in a Service Level Agreement (SLA). A maximum call blocking probability requirement indicates the maximum acceptable probability that an attempt to establish a call will fail because of insufficient bandwidth on the communication link.

In block 106, one or more specified QoS factors are received. For example, the one or more QoS factors may comprise a specified maximum packet loss probability requirement. For another example, the one or more QoS factors may comprise a specified maximum packet delay requirement. A maximum packet loss probability requirement indicates the maximum acceptable probability that a data packet transmitted on one end of the communication link will not be received on the other end of the communication link. A maximum packet delay requirement indicates the maximum acceptable amount of time that may occur between a data packet being transmitted on one end of the communication link and the data packet being received on the other end of the communication link. The data received in blocks 102, 104, and 106 may be received using any computer-implemented input process, such as user input to a software-generated user interface, reading from a data file, receiving a parameter value in a function call, method invocation, etc.

In block 108, user behavior relative to the communication link is determined. For example, the behavior of users who used the communication link in the past may be determined based on records of such behavior. User behavior may be determined based on the characteristics of calls made over the communication link. As described above, call characteristics may comprise the average inter-call arrival time and the average call duration. Call detail records ("CDRs") managed by a call manager may be used as source data.

In block 110, characteristics of traffic on the communication link are determined. For example, the characteristics of past traffic on the communication link may be determined based on records of such characteristics. As described above, traffic characteristics may comprise the frequency with which data packets arrive during calls on the communication link. Traffic characteristics also may comprise the average duration of burst periods during calls on the communication link.

In block 112, based on both the user behavior and the traffic characteristics, the minimum amount of bandwidth required for the communication link to support the specified number of users while satisfying the specified QoS and GoS factors is determined. The minimum amount may be approximated.

In block 114, the determined minimum amount of bandwidth is stored in memory. For example, the minimum amount may be stored in main memory 406 of computer system 400 illustrated in FIG. 4. The minimum amount may be presented to a user through a mechanism such as display 412, or communicated, using any programmatic data communication mechanism or messaging mechanism, to another system, application, or process. Based on the minimum amount, the user may replace an existing communication link with a communication link having the minimum amount of bandwidth determined.

By accounting for user behavior and traffic characteristics in combination rather than only one or the other in isolation, the required size of a communication link may be estimated more accurately. As a result, the cost associated with upgrading an existing communication link is minimized.

3.0 Method of Link Sizing Based on Both User Behavior and Traffic Characteristics 3.1 Formulating and Solving the Constraint Optimization Problem The link-sizing problem addressed in block 112 and elsewhere herein may be expressed as a constraint optimization problem. In this approach, given a current number of users K that use a current communication link with a capacity S, a minimum capacity S' of a communication link is determined subject to the constraints that:

$$\sum_{i=0}^{K'} P_i \cdot \varepsilon_i(S') \leq \theta$$

and:

$$S \leq S'$$

where K' is a specified number of users that the communication link will need to support, K' is typically greater than K, $P_i$ is the probability that i users are actively using the communication link while satisfying a specified maximum call blocking probability, $\varepsilon_i(S')$ is the packet loss probability when i users are using a communication link having capacity S', and $\theta$ is a specified maximum packet loss probability. The specified GoS factor, which in this case is the specified maximum call blocking probability, is captured in the determination of $P_i$. The specified QoS factor, which in this case is the specified maximum packet loss probability, is $\theta$.

The constraint optimization problem considers both user behavior and traffic characteristics. User behavior is expressed through $P_i$, while traffic characteristics are expressed through $\varepsilon_i(S')$. The combination of user behavior and traffic characteristics is expressed through the product of these terms, $P_i \cdot \varepsilon_i(S')$. This is allowed because the user behavior and the traffic characteristics are independent. That is, the user calling characteristics are independent of the traffic being generated during a call. Therefore, the determination of S', which is accomplished by solving the constraint optimization problem, takes into account a combination of user behavior and traffic characteristics.

Figure 2:
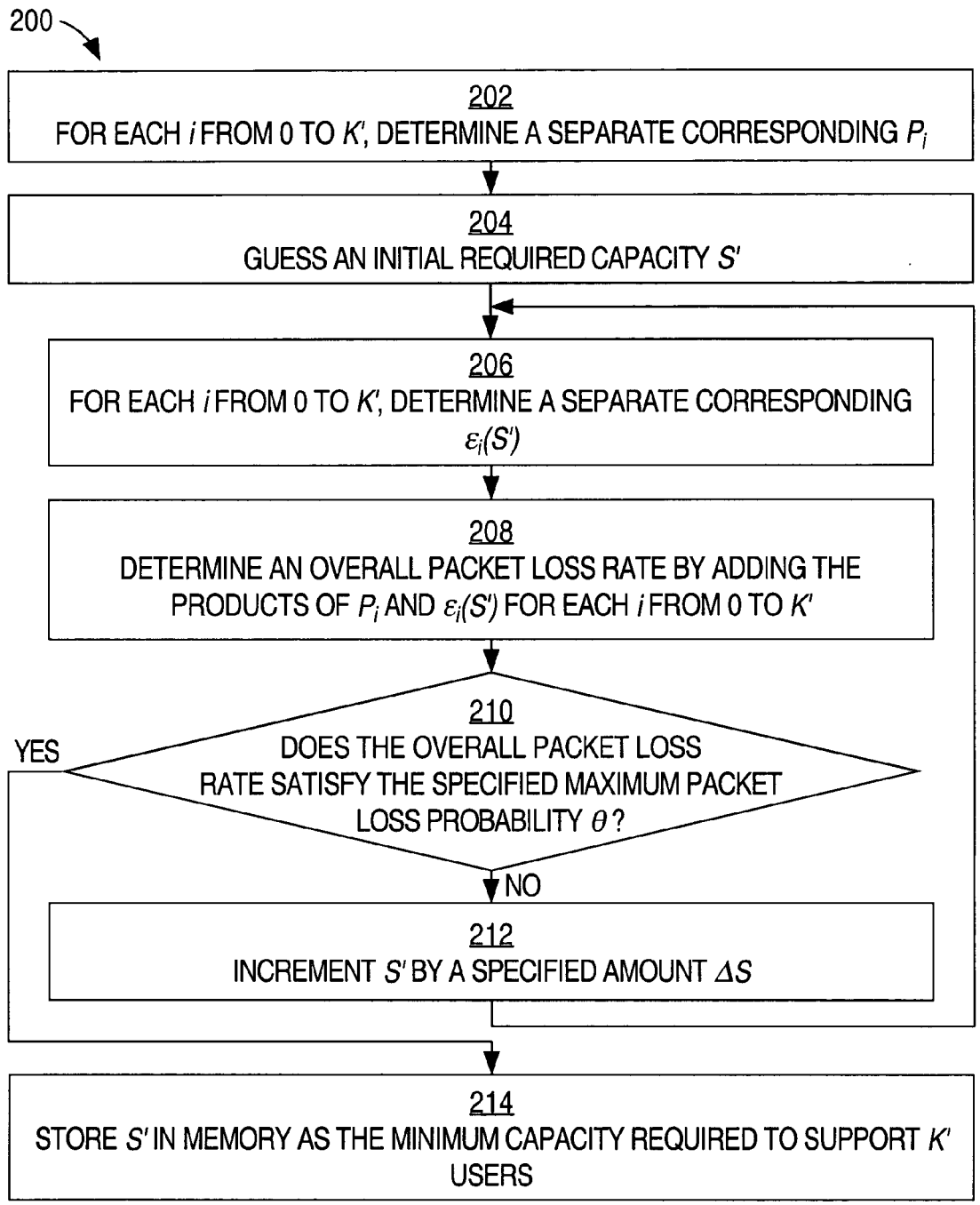
FIG. 2 is a flow diagram that illustrates one embodiment of a method for link sizing based on both user behavior and traffic characteristics.

FIG. 2 is a flow diagram that illustrates one embodiment of a method 200 for solving a constraint optimization problem that accounts for a combination of user behavior and traffic characteristics. Such a method may be performed by any of many different mechanisms, such as, for example, computer system 400 described below with reference to FIG. 4, or an application hosted by system 400.

In block 202, for each i from 0 to K', inclusive, a separate corresponding $P_i$ is determined. $P_i$ is the probability that i users are concurrently and actively using the communication link if the specified maximum call blocking probability is satisfied. Each $P_i$ may be referred to as a "state probability." Each state probability may be determined, for example, according to the well-known Erlang Loss Formula. Other techniques for determining each state probability also may be used.

In block 204, the initial required capacity S' is guessed. For example, S' initially may be guessed to be S.

In block 206, for each i from 0 to K', inclusive, a separate corresponding $\varepsilon_i(S')$ is determined. $\varepsilon_i(S')$ is probability that a given data packet will be lost when i users are using a communication link having capacity S'. Each $\varepsilon_i(S')$ may be referred to as a "marginal packet loss probability." Each marginal packet loss probability may be determined, for example, according to the well-known Fluid-Flow Analysis. Techniques for determining marginal packet loss probabilities are described in D. Anick, D. Mitra, and M. M. Sondhi, "Stochastic Theory of a Data-Handling System with Multiple Sources," *The Bell System Technical Journal*, vol. 51, pp. 1871-1894, October 1982; and M. Schwartz, *Broadband Integrated Networks*, Prentice Hall PTR, 1996. Other techniques for determining each marginal packet loss probability also may be used.

In block 208, an overall packet loss rate is determined by adding the products of $P_i$ and $\epsilon_i(S')$ for each i from 0 to K', inclusive. Multiplying the state probability with the corresponding marginal packet loss probability may be referred to as "weighting" the marginal packet loss probability with the corresponding state probability. The summation of the weighted probabilities is the overall packet loss rate. In other words, the overall packet loss rate on a communication link having a capacity S' may be expressed as:

$$\sum_{i=0}^{K'} P_i \cdot \epsilon_i(S').$$

In block 210, it is determined whether the overall packet loss rate satisfies the specified maximum packet loss probability θ. The overall packet loss rate satisfies the specified maximum packet loss probability if the overall packet loss rate is less than or equal to the specified maximum packet loss probability. If the overall packet loss rate satisfies the specified maximum packet loss probability, then control passes to block 214. Otherwise, control passes to block 212.

In block 212, the capacity S' is incremented by a specified amount ΔS. For example, ΔS may be the difference between the bandwidths of two commercially available communication links. Thus, if S' is the bandwidth of a T1 link, then ΔS may be selected to be the difference between the bandwidth of a T1 link and the bandwidth of a T3 link. Each time that S' is incremented in this manner, ΔS may be a different value. After S' has been incremented, control passes back to block 206.

Alternatively, in block 214, the capacity S' is stored in memory as the minimum capacity needed on a communication link that is to support K' users. S' may be presented to a user.

By incrementally determining whether various values of S' will cause the overall packet loss rate to satisfy the specified maximum packet loss probability concurrently with the satisfaction of the specified maximum call blocking probability, the minimum required capacity of a communication link needed to support a specified number of users may be determined.

PS 3.2 Modelling User Calling Behavior and Traffic Sources Using a Poisson Process and a Two State on/Off Process Many different techniques may be used to model user calling behavior and traffic sources. The selection of the techniques used to determine state probabilities and marginal packet loss probabilities may be based on the selected user calling behavior and traffic source models.

A traffic source may be modeled by a two state on/off process, with on and off periods being exponentially distributed with means $\alpha^{-1}$ and $\eta^{-1}$, respectively, and the packet arrival rate during the on period, γ. On periods are burst periods. Off periods are idle periods during which packets are not transmitted during a call. Voice traffic may be modeled in this way. The lengths of on and off periods during a call are independent of the number of calls made during a period of time. Thus, traffic characteristics are independent of user calling behavior.

Considering identical traffic sources and a communication link using a single-server queue with infinite waiting room, Fluid Flow Analysis may be used to estimate the packet loss rate by the tail distribution of the buffer occupancy l when the buffer occupancy exceeds a prescribed buffer size B, i.e., P(l<B). The packet loss rate may be determined by solving a set of differential equations that describe the equilibrium buffer occupancy. Such a set is described in D. Anick, D. Mitra, and M. M. Sondhi, "Stochastic Theory of a Data-Handling System with Multiple Sources," *The Bell System Technical Journal*, vol. 51, pp. 1871-1894, October 1982; and M. Schwartz, *Broadband Integrated Networks*, Prentice Hall PTR, 1996.

User calling behavior may be modeled by a Poisson process, such that average inter-call arrival time and average call duration are exponentially distributed with means $\lambda^{-1}$ and $\mu^{-1}$, respectively. The communication link may be modeled by an M/M/K'/K' queuing system, which is also known as the Erlang Model. User behavior may be analyzed using the Erlang Loss Formula.

Thus, according to one embodiment, it is desirable to determine the minimum capacity S' subject to the constraints that:

$$\sum_{i=0}^{K'} P_i \cdot \epsilon_i(\alpha, \eta, \gamma, B, S') \le \theta$$

and:

$$S \le S'$$

where K' is the specified number of users that the communication link will need to support; $P_i$ is the probability that i users are actively using the communication link while satisfying the specified maximum call blocking probability (using the Erlang Model); $\epsilon_i(\alpha,\eta,\gamma,B,S')$ is the packet loss probability (using the Fluid Flow Model) when i users are using a communication link having capacity S' and an associated buffer size B, when the mean on period is $\alpha^{-1}$, the mean off period is $\eta^{-1}$, and the packet rate during the on period is γ; and θ is the specified maximum packet loss probability.

Figure 3:
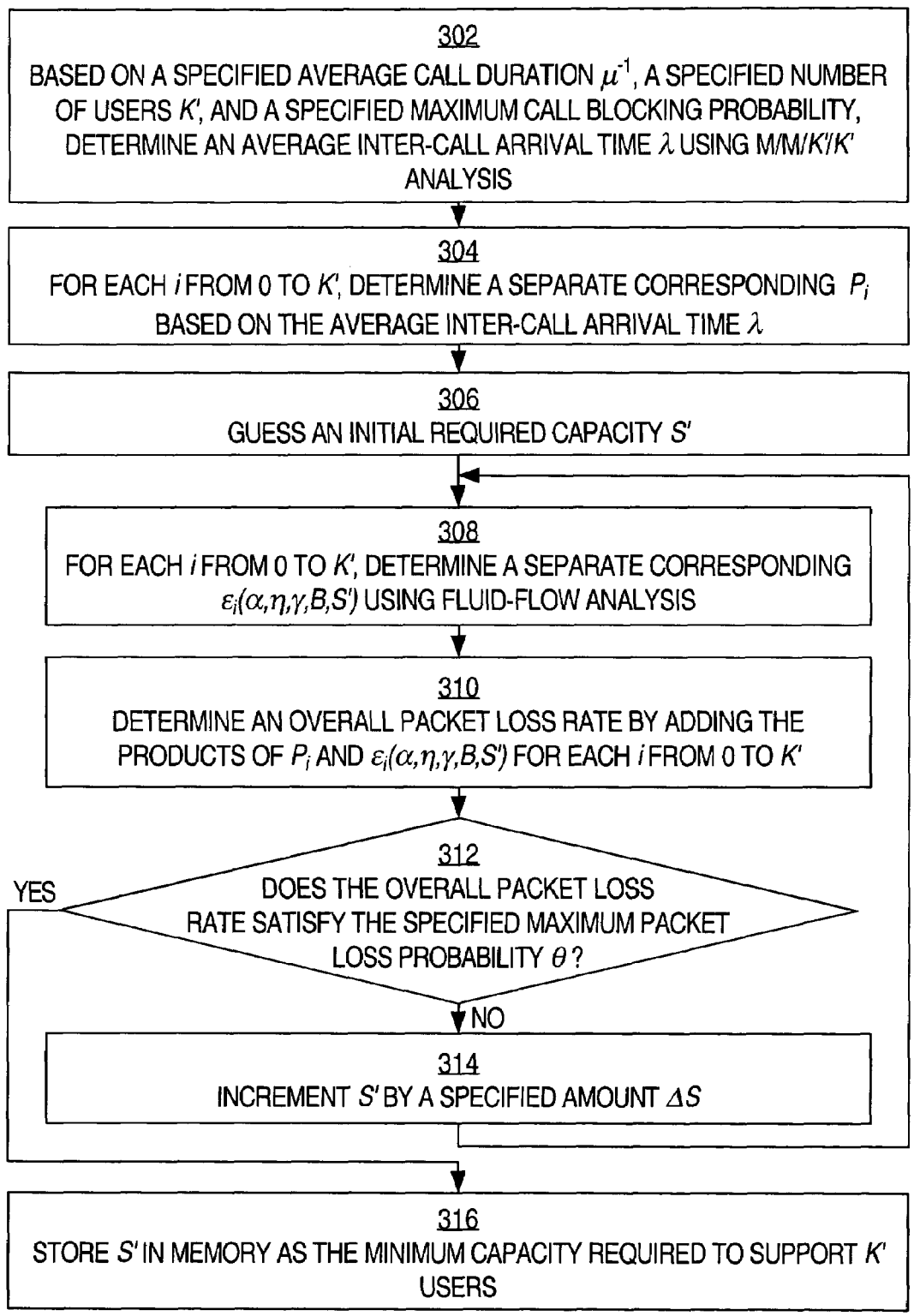
FIG. 3 is a flow diagram that illustrates one embodiment of a method for solving a constraint optimization problem when traffic sources and user calling behavior are modeled by a two state on/off process and a Poisson process, respectively.

FIG. 3 is a flow diagram that illustrates one embodiment of a method 300 for solving a constraint optimization problem when data traffic and user calling behavior are modeled by a two state on/off process and a Poisson process, respectively. Such a method may be performed by any of many different mechanisms, such as, for example, computer system 400 described below with reference to FIG. 4.

In block 302, based on a specified average call duration $\mu^{-1}$, a specified number of users K', and a specified maximum call blocking probability, an average inter-call arrival time λ is determined using M/M/K'/K' Analysis (Erlang Analysis).

In block 304, for each i from 0 to K', inclusive, a separate corresponding $P_i$ is determined based on the average inter-call arrival time λ. $P_i$ is the probability that i users are concurrently and actively using the communication link if the specified maximum call blocking probability is satisfied.

In block 306, the initial required capacity S' is guessed. For example, S' initially may be guessed to be S.

In block 308, for each i from 0 to K', inclusive, a separate corresponding $\epsilon_i(\alpha,\eta,\gamma,B,S')$ is determined using Fluid-Flow Analysis. $\epsilon_i(\alpha,\eta,\gamma,B,S')$ is probability that a given data packet will be lost when i users are using a communication link having capacity S' and an associated buffer size B, when the mean on period is $\alpha^{-1}$, the mean off period is $\eta^{-1}$, and the packet rate during the on period is γ.

In block 310, an overall packet loss rate is determined by adding the products of $P_i$ and $\epsilon_i(\alpha,\eta,\gamma,B,S')$ for each i from 0 to K', inclusive. The overall packet loss rate on a communication link having a capacity S' and a buffer size B, when the mean on period is $\alpha^{-1}$, the mean off period is $\eta^{-1}$, and the packet rate during the on period is $\gamma$, may be expressed as:

$$\sum_{i=0}^{K'} P_i \cdot \varepsilon_i(\alpha, \eta, \gamma, B, S').$$

In block 312, it is determined whether the overall packet loss rate satisfies the specified maximum packet loss probability $\theta$. The overall packet loss rate satisfies the specified maximum packet loss probability if the overall packet loss rate is less than or equal to the specified maximum packet loss probability. If the overall packet loss rate satisfies the specified maximum packet loss probability, then control passes to block 316. Otherwise, control passes to block 314.

In block 314, the capacity S' is incremented by a specified amount $\Delta S$. After S' has been incremented, control passes back to block 308.

Alternatively, in block 316, the capacity S' is stored in memory as the minimum capacity needed on a communication link that is to support K' users. S' may be presented to a user.

4.0 Implementation Mechanisms—Hardware Overview

Figure 4:
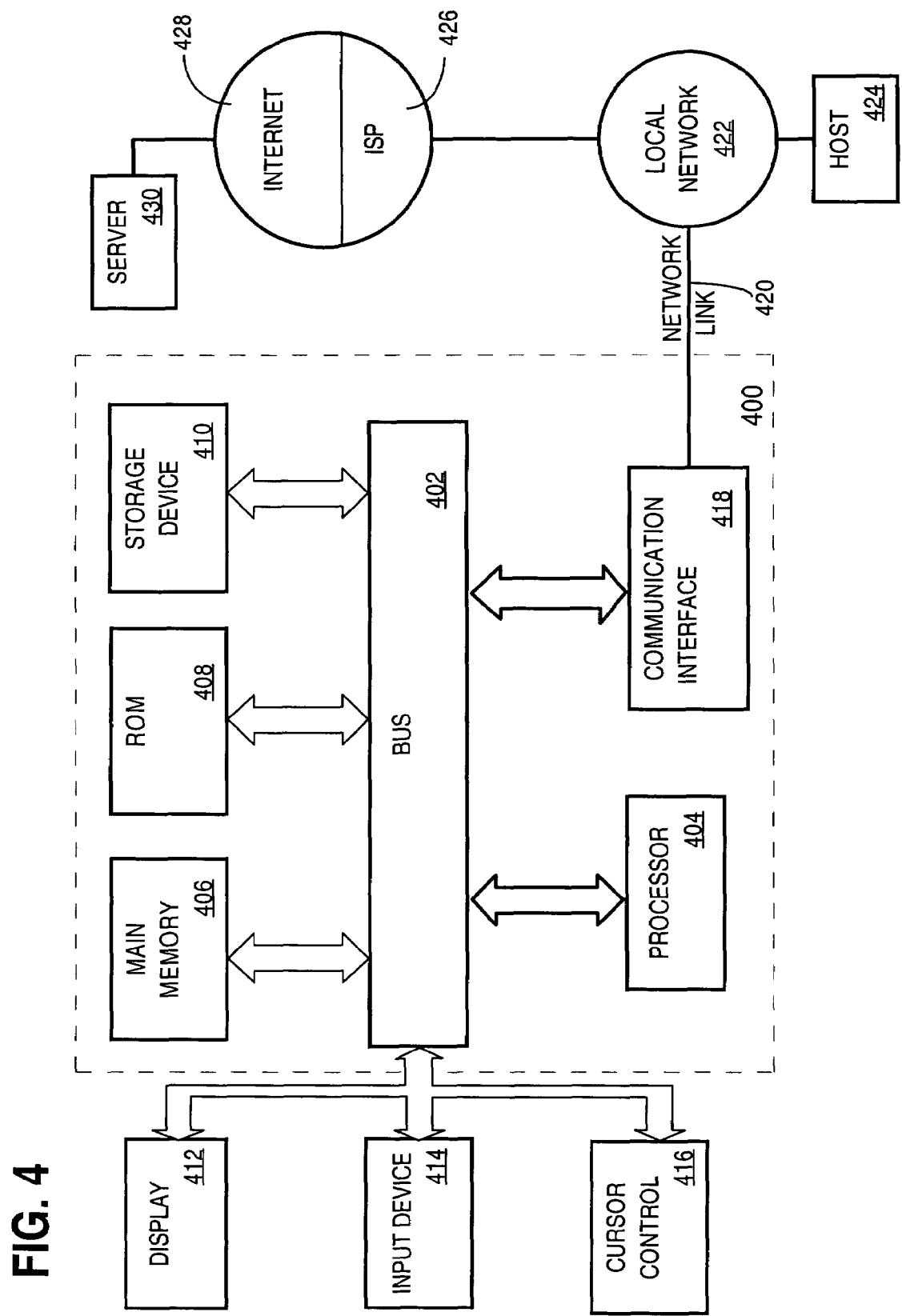
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for link sizing based on both user behavior and traffic characteristics. According to one embodiment of the invention, link sizing based on both user behavior and traffic characteristics is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for link sizing based on both user behavior and traffic characteristics as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while a technique described above can be used for "upsizing" a link, a similar technique may be used for "downsizing" a link to accommodate decreased demand. When downsizing a link, the constraint $S \leq S'$ in the optimization problem described above changes to $S \geq S'$, and K typically is greater than K' rather than vice-versa. Instead of incrementing S' by a specified amount, as in blocks 214 and 314 above, S' is decremented by the specified amount. Instead of storing S' as the minimum capacity required when the overall packet loss rate satisfies the specified maximum packet loss probability, as in blocks 210, 214, 312, and 316 above, S' is stored as the minimum capacity required when further decrementing S' by the specified amount would cause the overall packet loss rate to not satisfy the specified maximum packet loss probability.

What is claimed is:

1. A method comprising:

receiving a grade of service (GoS) factor and a quality of service (QoS) factor, wherein the GoS factor specifies a maximum call blocking probability for a link and the QoS factor specifies a maximum packet loss probability for said link;

determining, for each of one or more candidate link sizes of said link, a plurality of state probabilities based on the GoS factor and a plurality of marginal packet loss probabilities based on the QoS factor, wherein said determining is performed based on user behavior and traffic characteristics;

determining, based on user behavior and traffic characteristics, a link size of said link;

wherein determining said link size of said link comprises selecting one of the one or more candidate link sizes of said link using the plurality of state probabilities and the plurality of marginal packet loss probabilities; and storing said link size of said link in memory;

wherein determining said link size of said link is based on a product of:

a state probability in the plurality of state probabilities, wherein the state probability is a probability that a specified number of users are using said link when a specified maximum call blocking probability requirement is satisfied relative to said link; and a marginal packet loss probability in the plurality of marginal packet loss probabilities, wherein the marginal packet loss probability is a probability that a packet is lost when said packet is sent through said link that:

has a specified amount of bandwidth; and is being used by said specified number of users.

2. The method of claim 1, wherein said user behavior comprises an average time between arrivals of calls made by one or more users using said link.

3. The method of claim 1, wherein said user behavior comprises an average duration of calls made by one or more users using said link.

4. The method of claim 1, wherein said traffic characteristics comprise an average time between arrivals of packets on said link.

5. The method of claim 1, wherein said traffic characteristics comprise an average duration of periods during which packets are transmitted relatively continuously on said link.

6. The method of claim 1, wherein determining said link size of said link is based on a specified number of users.

7. The method of claim 1, wherein each of the plurality of state probabilities is a probability that a specified number of users are using said link when a specified maximum call blocking probability requirement is satisfied relative to said link.

8. The method of claim 1, wherein each of the plurality of marginal packet loss probabilities is a probability that a packet is lost when said packet is sent through said link that:

has a specified amount of bandwidth; and is being used by a specified number of users.

9. A volatile or non-volatile computer-readable medium storing one or more sequences of instructions, which instructions, when executed by one or more processors, cause the one or more processors to carry out the steps of:

receiving a grade of service (GoS) factor and a quality of service (QoS) factor, wherein the GoS factor specifies a maximum call blocking probability for a link and the QoS factor specifies a maximum packet loss probability for said link;

determining, for each of one or more candidate link sizes of said link, a plurality of state probabilities based on the GoS factor and a plurality of marginal packet loss probabilities based on the QoS factor, wherein said determining is performed based on user behavior and traffic characteristics;

determining, based on user behavior and traffic characteristics, a link size of said link;

wherein determining said link size of said link comprises selecting one of the one or more candidate link sizes of said link using the plurality of state probabilities and the plurality of marginal packet loss probabilities; and storing said link size of said link in memory;

wherein said link size of said link is determined based on a product of:

a state probability in the plurality of state probabilities, wherein the state probability is a probability that a specified number of users are using said link when a specified maximum call blocking probability requirement is satisfied relative to said link; and a marginal packet loss probability in the plurality of marginal packet loss probabilities, wherein the marginal packet loss probability is a probability that a packet will be lost when said packet is sent through said link that:
has a specified amount of bandwidth; and
is being used by said specified number of users.

10. The volatile or non-volatile computer-readable medium of claim 9, wherein said user behavior comprises an average time between arrivals of calls made by one or more users using said link.

11. The volatile or non-volatile computer-readable medium of claim 9, wherein said user behavior comprises an average duration of calls made by one or more users using said link.

12. The volatile or non-volatile computer-readable medium of claim 9, wherein said traffic characteristics comprise an average time between arrivals of packets on said link.

13. The volatile or non-volatile computer-readable medium of claim 9, wherein said traffic characteristics comprise an average duration of periods during which packets are transmitted relatively continuously on said link.

14. The volatile or non-volatile computer-readable medium of claim 9, wherein determining said link size of said link is based on a specified number of users.

15. The volatile or non-volatile computer-readable medium of claim 9, wherein each of the plurality of state probabilities is a probability that a specified number of users are using said link when a specified maximum call blocking probability requirement is satisfied relative to said link.

16. An apparatus comprising:
means for receiving a grade of service (GoS) factor and a quality of service (QoS) factor, wherein the GoS factor specifies a maximum call blocking probability for a link and the QoS factor specifies a maximum packet loss probability for said link;
means for determining, for each of one or more candidate link sizes of said link, a plurality of state probabilities based on the GoS factor and a plurality of marginal packet loss probabilities based on the QoS factor, wherein said determining is performed based on user behavior and traffic characteristics;
means for determining, based on user behavior and traffic characteristics, a link size of said link;
wherein determining said link size of said link comprises selecting one of the one or more candidate link sizes of said link using the plurality of state probabilities and the plurality of marginal packet loss probabilities; and
means for storing said link size of said link in memory;
wherein said link size of said link is determined based on a product of:
a state probability in the plurality of state probabilities, wherein the state probability is a probability that a specified number of users are using said link when a specified maximum call blocking probability requirement is satisfied relative to said link; and
a marginal packet loss probability in the plurality of marginal packet loss probabilities, wherein the marginal packet loss probability is a probability that a packet will be lost when said packet is sent through said link that:
has a specified amount of bandwidth; and
is being used by said specified number of users.

17. The apparatus of claim 16, wherein said user behavior comprises an average time between arrivals of calls made by one or more users using said link.

18. The apparatus of claim 16, wherein said user behavior comprises an average duration of calls made by one or more users using said link.

19. The apparatus of claim 16, wherein said traffic characteristics comprise an average time between arrivals of packets on said link.

20. The apparatus of claim 16, wherein said traffic characteristics comprise an average duration of periods during which packets are transmitted relatively continuously on said link.

21. The apparatus of claim 16, wherein determining said link size of said link is based on a specified number of users.

22. The apparatus of claim 16, wherein each of the plurality of state probabilities is a probability that a specified number of users are using said link when a specified maximum call blocking probability requirement is satisfied relative to said link.

23. An apparatus comprising:
a network interface that is coupled to a data network for receiving one or more packet flows therefrom;
a processor; and
one or more stored sequences of instructions which, when executed by the processor, cause the processor to carry out the steps of:
receiving a grade of service (GoS) factor and a quality of service (QoS) factor, wherein the GoS factor specifies a maximum call blocking probability for a link and the QoS factor specifies a maximum packet loss probability for said link;
determining, for each of one or more candidate link sizes of said link, a plurality of state probabilities based on the GoS factor and a plurality of marginal packet loss probabilities based on the QoS factor, wherein said determining is performed based on user behavior and traffic characteristics;
determining, based on user behavior and traffic characteristics, a link size of said link;
wherein determining said link size of said link comprises selecting one of the one or more candidate link sizes of said link using the plurality of state probabilities and the plurality of marginal packet loss probabilities; and
storing said link size of said link in memory;
wherein said link size of said link is determined based on a product of:
a state probability in the plurality of state probabilities, wherein the state probability is a probability that a specified number of users are using said link when a specified maximum call blocking probability requirement is satisfied relative to said link; and
a marginal packet loss probability in the plurality of marginal packet loss probabilities, wherein the marginal packet loss probability is a probability that a packet will be lost when said packet is sent through said link that:
has a specified amount of bandwidth; and
is being used by said specified number of users.

24. The apparatus of claim 23, wherein said user behavior comprises an average time between arrivals of calls made by one or more users using said link.

25. The apparatus of claim 23, wherein said user behavior comprises an average duration of calls made by one or more users using said link.

26. The apparatus of claim 23, wherein said traffic characteristics comprise an average time between arrivals of packets on said link.

27. The apparatus of claim 23, wherein said traffic characteristics comprise an average duration of periods during which packets are transmitted relatively continuously on said link.

28. The apparatus of claim 23, wherein determining said link size of said link is based on a specified number of users.

29. The apparatus of claim 23, wherein each of the plurality of state probabilities is a probability that a specified number of users are using said link when a specified maximum call blocking probability requirement is satisfied relative to said link.

* * * * *